US012527493B2

(12) United States Patent
Abeyratne et al.

(10) Patent No.: US 12,527,493 B2
(45) Date of Patent: Jan. 20, 2026

(54) METHOD AND APPARATUS FOR PROCESSING ASTHMA PATIENT COUGH SOUND FOR APPLICATION OF APPROPRIATE THERAPY

(71) Applicant: THE UNIVERSITY OF QUEENSLAND, Brisbane (AU)

(72) Inventors: Udantha Abeyratne, Red Hill (AU); Vinayak Swarnkar, Red Hill (AU); Paul Anthony Porter, Red Hill (AU)

(73) Assignee: THE UNIVERSITY OF QUEENSLAND, Brisbane (AU)

( * ) Notice: Subject to any disclaimer, the term of this patent is extended or adjusted under 35 U.S.C. 154(b) by 847 days.

(21) Appl. No.: 17/636,429

(22) PCT Filed: Aug. 19, 2020

(86) PCT No.: PCT/AU2020/050858
§ 371 (c)(1),
(2) Date: Feb. 18, 2022

(87) PCT Pub. No.: WO2021/030865
PCT Pub. Date: Feb. 25, 2021

(65) Prior Publication Data
US 2022/0280065 A1 Sep. 8, 2022

(30) Foreign Application Priority Data
Aug. 19, 2019 (AU) ................ 2019903000

(51) Int. Cl.
*A61B 5/08* (2006.01)
*A61B 5/00* (2006.01)
(Continued)

(52) U.S. Cl.
CPC ........... *A61B 5/0823* (2013.01); *A61B 5/002* (2013.01); *A61B 5/0022* (2013.01);
(Continued)

(58) Field of Classification Search
CPC ............ G16H 50/70; A61B 2562/0204; A61B 5/7264; A61B 5/7275; A61B 2562/0219;
(Continued)

(56) References Cited

U.S. PATENT DOCUMENTS

| 11,304,624 B2 * | 4/2022 | Stamatopoulos .... A61B 5/7278 |
| 2011/0125044 A1 | 5/2011 | Rhee et al. |
| 2020/0098384 A1 * | 3/2020 | Nematihosseinabadi .................... G10L 15/02 |

FOREIGN PATENT DOCUMENTS

| WO | 2001/019243 | 3/2001 |
| WO | 2013/142908 | 10/2013 |

(Continued)

OTHER PUBLICATIONS

Abeyratne, U.R., et al. Cough Sound Analysis Can Rapidly Diagnose Childhood Pneumonia. 2013 Ann Biomed Eng 41, (Year: 2013).*

(Continued)

*Primary Examiner* — Eric F Winakur
*Assistant Examiner* — Sienna C Pyle
(74) *Attorney, Agent, or Firm* — Nixon & Vanderhye PC

(57) ABSTRACT

A method for stratifying severity of asthma of a patient initially comprises receiving acoustic data corresponding to sounds of the patient from an acoustic sensor and identifying, by a processor, at least one cough sound in the acoustic data. With or without the patient being present, the method further involves determining, by operation of the processor, one or more overall cough sound feature values of the at least one cough sound for each of one or more characteristic features. The overall cough sound feature values are then applied to a classifier that is implemented by the processor and which has been pre-trained with a training set of characteristic feature values from a population of asthmatic and non-asthmatic subjects. The method then involves (Continued)

monitoring an output from the pre-trained classifier to deem the patient cough sound as indicating one of a number of degrees of severity of asthma.

12 Claims, 6 Drawing Sheets

(51) Int. Cl.
    *A61B 7/00*       (2006.01)
    *G16H 50/20*    (2018.01)
    *G16H 50/70*    (2018.01)

(52) U.S. Cl.
    CPC .......... *A61B 5/4842* (2013.01); *A61B 5/7246* (2013.01); *A61B 5/726* (2013.01); *A61B 5/7267* (2013.01); *A61B 7/003* (2013.01); *G16H 50/20* (2018.01); *G16H 50/70* (2018.01); *A61B 2562/0204* (2013.01); *G06F 2218/10* (2023.01); *G06F 2218/12* (2023.01)

(58) Field of Classification Search
    CPC ... A61B 5/7405; A61B 7/003; G06F 2218/10; G06F 2218/12; G10L 25/66
    See application file for complete search history.

(56) References Cited

FOREIGN PATENT DOCUMENTS

| | | |
|---|---|---|
| WO | 2018/011113 | 1/2018 |
| WO | 2019/119050 | 6/2019 |

OTHER PUBLICATIONS

M. V. A. Rao, et al., "Automatic prediction of spirometry readings from cough and wheeze for monitoring of asthma severity," 2017 25th European Signal Processing Conference (Year: 2017).*
International Search Report for PCT/AU2020/050858, mailed Nov. 20, 2020, 4 pages.
Written Opinion of the ISA for PCT/AU2020/050858, mailed Nov. 20, 2020, 5 pages.

* cited by examiner

METHOD AND APPARATUS FOR PROCESSING ASTHMA PATIENT COUGH SOUND FOR APPLICATION OF APPROPRIATE THERAPY

RELATED APPLICATIONS

This application is the U.S. national phase of International Application No. PCT/AU2020/050858 filed 19 Aug. 2020, which designated the U.S. and claims priority from Australian provisional patent application No. 2019903000 filed 19 Aug. 2019, the entire contents of which are hereby incorporated herein by reference for all purposes.

TECHNICAL FIELD

The present invention relates to automatically determining the presence and severity of asthma in a subject.

BACKGROUND

Any references to methods, apparatus or documents of the prior art are not to be taken as constituting any evidence or admission that they formed, or form part of the common general knowledge.

Asthma is a common childhood respiratory disorder characterized by wheeze, cough and respiratory distress. Asthma severity can be determined by subjective, manual scoring systems such as the Pulmonary Score. These systems require significant medical training and expertise to rate clinical findings such as wheeze characteristics, and work of breathing. The ability to correctly characterize the severity of asthma in a patient is valuable because depending on the severity of the asthma, which is responsive to bronchodilator drugs for example, a correct treatment and management therapy can be put in place.

Acute asthma is characterized by episodic, reversible airflow obstruction and presents with wheeze, respiratory distress and cough responsive to bronchodilator medication [3]. The underlying pathophysiology is restricted air flow through partially constricted small and large airways, causing wheeze and increased work of breathing, manifesting as increased respiratory rate and accessory muscle use. Wheeze characteristics may change with increasing obstruction, while in severe disease there may be insufficient airflow to generate any wheeze, resulting in a "silent chest".

The ability to detect wheeze by auscultation is dependent on (i) the sound being generated within the lungs with sufficient intensity to reach the chest wall to be detected by a stethoscope; (ii) the clinician having sufficient hearing acuity; and (iii) clinical skill and experience to recognise its defining characteristics.

Various measures of airway obstruction have been developed. Objective tests include spirometry and Peak Expiratory Flow Rate (PEFR) measurements [6]. In acute settings, formal spirometry is not available or practical. The PEFR meter has the advantage of being inexpensive and portable. However young children (<6 years) and those in significant respiratory distress are often unable to comply with PEFR tests which are technique and effort dependent and require cooperation. PEFR measurement is not recommended for routine use in children under 12 years [3].

Clinical rating scales use combinations of clinical features to guide asthma management, gauge response to therapy, and to determine the urgency of care. The Pulmonary Score (PS) is an asthma severity scale commonly used in clinical practice and is comparable to PEFR measures [9]. It is commonly used in Western Australian hospitals and is relied on extensively in routine clinical practice [10]. The PS utilizes respiratory rate (RR), wheeze characteristics and accessory (sternocleidomastoid) muscle (AM) use to generate a score out of 9 (Table 1). Breathing rates can easily be determined, even by a lay user with minimal or no training. The assessment and grading of wheeze characteristics and AM use, however, require significant medical training and expertise. Assessment of wheeze requires an examination by stethoscope. While the PS can provide critical information in managing childhood asthma in all settings, it is not a practical assessment tool outside of clinical practices or hospitals. The primary aim of this study was to develop a community-deployable technology to assess asthma severity.

TABLE 1

| | | Score (total out of 9) | | | |
|---|---|---|---|---|---|
| | | 0 | 1 | 2 | 3 |
| Respiratory rate (RR) | <6 yrs | <30 | 31-45 | 46-60 | >60 |
| | ≥6 yrs | <20 | 21-35 | 36-50 | >50 |
| Wheezing | | None | End expiratory with stethoscope | Entire expiration with stethoscope | Inspiration and expiration without stethoscope (or no wheezing due to minimal air exchange) |
| Accessory muscle use (AM) | | None | Mild increase | Increased | Maximal activity |

(above): The Pulmonary Score. Clinicians estimate sub-scores (0-3) from the respiratory rate, wheeze and the accessory muscle use. The overall PS, which indicates a degree of severity of asthma in the subject, is the sum of all three sub-scores.

There is a need for an automated method to stratify asthma severity that does not rely on clinical assessment of wheeze severity (auscultation) or accessory muscle use.

SUMMARY OF THE INVENTION

According to a first aspect of the present invention there is provided a method for stratifying severity of asthma of a patient, the method comprising:
  receiving acoustic data corresponding to sounds of the patient from an acoustic sensor;
  identifying, by a processor, at least one cough sound in the acoustic data;
  determining, by the processor, one or more overall cough sound feature values of the at least one cough sound for each of one or more characteristic features;
  applying, by the processor, the overall cough sound feature values to a classifier implemented by the processor, said classifier having been pre-trained with a training set of characteristic feature values from a population of asthmatic and non-asthmatic subjects; and
  monitoring an output from the pre-trained classifier to deem the patient cough sound as indicating one of a number of degrees of severity of asthma.

In an embodiment the one or more overall cough sound feature values for the one or more characteristic features comprises values of wavelet features of the cough sound.

In an embodiment the degrees of severity include "mild" or "moderate to severe".

In an embodiment the method includes applying, by the processor, a respiratory rate value, being a respiratory rate of the patient or a value derived therefrom, to the pre-trained classifier in addition to the overall cough sound feature values to deem the patient cough sound as indicating one of a number of degrees of severity of asthma wherein the degrees of severity of asthma include "mild", "moderate" and "severe".

In an embodiment the respiratory rate value comprises a Breathing Index based on the respiratory rate taking into account an age of the patient.

In an embodiment the method includes segmenting, by the processor, each at least one cough sound into a plurality of segments.

In an embodiment the method includes determining, by the processor, segment feature values for each of the plurality of segments in respect of each of a number of characteristic features.

In an embodiment the plurality of segments comprises three segments.

In an embodiment the method includes applying, by the processor, the segment feature values to the pre-trained classifier in addition to the overall cough feature values.

In an embodiment the method includes determining, by the processor, segment feature values for each of a number of characteristic features comprise determining values in respect of one or more of the segments for one or more of: MFCC1, MFCC2, MFCC3, MFCC4, MFCC6, MFCC9 and MFCC12.

In an embodiment the method includes determining, by the processor, kurtosis values for a first segment.

In an embodiment the method includes determining, by the processor values in respect of each segment for one or more of the following characteristic features:

Bispectrum Score (BGS);

Non-Gaussianity score (NGS);

first n formant frequencies (FF);

log energy (LogE);

zero crossing (ZCR);

kurtosis (Kurt);

first n Mel-frequency cepstral coefficients (MFCC).

In an embodiment the determining, by the processor, of segment feature values for each of a number of characteristic features comprises determining 21 feature values for each segment as follows:

| Feature | Number of Values |
|---|---|
| BGS | 1 |
| NGS | 1 |
| FF1, . . . , FF4 | 4 |
| LogE | 1 |
| ZCR | 1 |
| Kurt | 1 |
| MFFCC1-MFCC12 | 12 |
| Total: | 21 |

In an embodiment the determining, by the processor, of segment feature values for each of a number of characteristic features comprises determining feature values for each of the three segments as follows:

| Features | Cough Segment/ Overall Cough |
|---|---|
| KRT | Segment 1 |
| Mfcc1 | Segment 3 |
| Mfcc2 | Segment 3 |
| Mfcc3 | Segment 1 |
| mfcc4 | Segment 1 |
| mfcc6 | Segment 2 |
| mfcc9 | Segment 1 |
| mfcc12 | Segment 3 |
| WvL2 | Overall Cough |
| WvL3 | |
| WvL5 | |
| WvL10 | |

According to another aspect of the present invention there is provided a system including one or more processors arranged to process sounds of a human subject according to the previously described method.

According to a further aspect of the present invention there is provided an asthma severity machine for determining and presenting asthma severity of a patient, the machine including:

an electronic memory;

at least one processor in communication with the electronic memory configured by instructions stored in the electronic memory;

an audio recording assembly in communication with the at least one processor;

a human-machine interface in communication with the at least one processor;

wherein the electronic memory stores instructions configuring the at least one processor to:

process a digital recording of the patient to identify at least one cough sound;

extract one or more overall cough sound feature values of the cough sound for each of one or more characteristic features;

implement a pre-trained pattern classifier for asthma severity, said classifier having been pre-trained with a training set of characteristic feature values from a population of asthmatic and non-asthmatic subjects; and;

apply the overall cough sound feature values to the pre-trained pattern classifier; and operate the human/machine interface to present an asthma severity classification based on an output from the pre-trained pattern classifier.

In an embodiment the electronic memory stores instructions configuring the at least one processor to extract one or more overall cough sound feature values including values of wavelet features of the cough sound.

In an embodiment the electronic memory stores instructions configuring the at least one processor to operate the human/machine interface to present an asthma severity classification based on an output from the pre-trained pattern classifier comprising a classification of "mild" or "moderate to severe".

In an embodiment the electronic memory stores instructions configuring the at least one processor to apply a respiratory rate value, being a respiratory rate of the patient or a value derived therefrom, to the pre-trained classifier in addition to the overall cough sound feature values to operate the human/machine interface to present degrees of severity of asthma including "mild", "moderate" and "severe".

In an embodiment the electronic memory stores instructions configuring the at least one processor to segment each at least one cough sound into a plurality of segments.

In an embodiment the electronic memory stores instructions configuring the at least one processor to segment feature values for each of the plurality of segments in respect of each of a number of characteristic features.

In an embodiment the electronic memory stores instructions configuring the at least one processor to apply the segment feature values to the pre-trained classifier in addition to the overall cough feature values.

In an embodiment the electronic memory stores instructions configuring the at least one processor to determine characteristic feature values in respect of one or more of the segments for one or more of:

MFCC1, MFCC2, MFCC3, MFCC4, MFCC6, MFCC9 and MFCC12.

In an embodiment the electronic memory stores instructions configuring the at least one processor to determine kurtosis values for a first segment.

In an embodiment the electronic memory stores instructions configuring the at least one processor to to obtain an estimate of a breathing rate of the patient.

In an embodiment the electronic memory stores instructions configuring the at least one processor to analyse signals from an accelerometer placed on or adjacent the patient to determine patient respiratory rate.

In an embodiment the electronic memory stores instructions configuring the at least one processor to process signals from the acoustic sensor for detecting breath sounds from the patient to thereby calculate a respiratory rate estimate.

In an embodiment the electronic memory stores instructions configuring the at least one processor to monitor signals from a Lens and CCD assembly positioned to capture images of rising and falling of a chest of the patient to thereby produce a respiratory rate from the images.

According to another aspect of the present invention there is provided a method for stratifying severity of asthma of a patient, the method comprising:

receiving acoustic data from an acoustic sensor placed proximal the patient;

identifying, by a processor, at least one cough sound in the acoustic data;

segmenting, by the processor, the cough sound into a plurality of segments;

determining, by the processor, segment feature values for each of a number of characteristic features;

applying, by the processor, the segment feature values to a pre-trained classifier implemented by the processor; and monitoring an output from the pre-trained classifier to deem the patient cough sound as indicating one of a number of degrees of severity.

In another aspect there is provided an asthma severity indicator assembly for indicating the severity of asthma of a patient, comprising:

an audio capture arrangement including a microphone and analog-to-digital conversion circuitry configured to store a digital audio recording of the patient in an electronic memory;

a cough identification assembly in communication with the memory and arranged to process the digital audio recording to thereby identify portions of the digital audio recording comprising cough sounds of the patient;

a cough segmentation assembly responsive to the cough identification assembly and arranged to segment each identified cough into a number of segments;

a feature extraction processor in communication with the cough segmentation assembly and arranged to process each of the segments to generate segment feature values for each segment in respect of each of a number of characteristic features; and a pattern classifier in communication with the feature extraction processor configured to produce a signal indicating the patient cough sound as being one of a number of degrees of severity.

In a further aspect there is provided an asthma severity machine for determining and presenting asthma severity of a patient, the machine including:

an electronic memory;

at least one processor in communication with the electronic memory configurable by instructions stored in the electronic memory;

an audio recording assembly in communication with the at least one processor;

a human-machine interface in communication with the at least one processor;

wherein the electronic memory stores instructions for the processor to:

process a digital recording of the patient to identify at least one cough sound;

extract features from the cough sound and from segments thereof;

implement a pre-trained pattern classifier for asthma severity;

apply the features to the pre-trained pattern classifier; and operate the human/machine interface to present a asthma severity classification based on an output from the pre-trained pattern classifier.

In another aspect there is provided a method for stratifying severity of asthma of a patient including: applying values of features of a cough sound of the patient to a pattern classifier that has been pre-trained using a population of asthma suffers of varying degrees of severity.

In a further aspect there is provided an asthma severity machine arranged to capture a cough sound of a patient and apply values of features from the cough sound to a pattern classifier that has been pre-trained with a population of asthma suffers of varying degrees of asthma severity and to present a classification based on an output of the pattern classifier.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
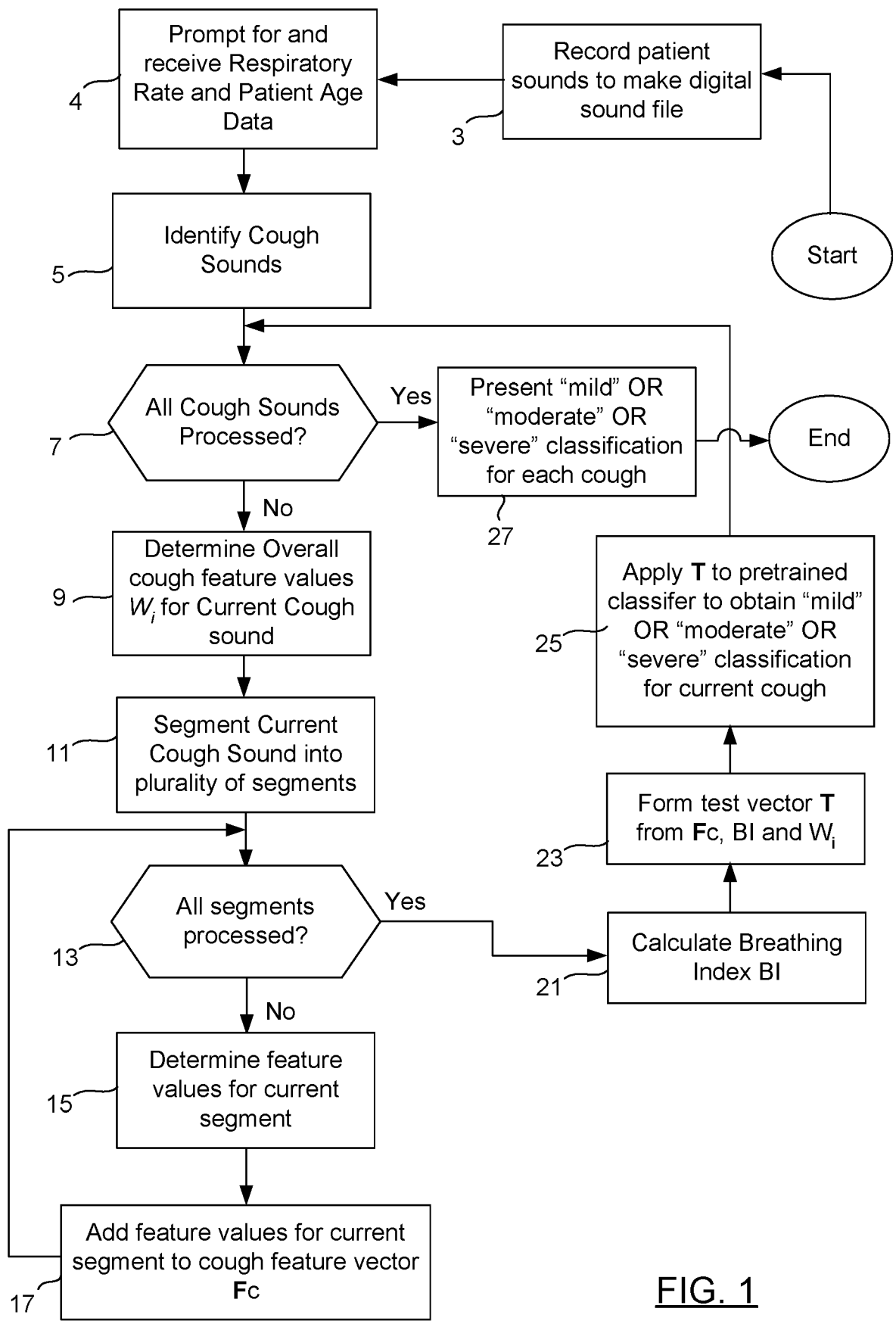
FIG. 1 is a flowchart of a method for presenting asthma severity of a patient.

FIG. 1 is a flowchart of a method according to a preferred embodiment of the present invention for classifying asthma of a patient as one of "mild", "moderate" or "severe".

An apparatus that is used to implement the method comprises an asthma stratifying machine or as it may be called an asthma severity indicator assembly. The asthma stratifying machine may be a dedicated assembly that includes specific circuitry to carry out various operations that will be discussed for classifying asthma. Alternatively, the asthma stratifying machine may be a desktop computer or a portable computational device such as a smartphone that contains at least one processor in communication with an electronic memory that stores instructions that specifically configure the processor in operation to carry out the steps of the method as will be described. It will be appreciated that it is impossible to carry out the method without either a dedicated machine or an assembly or system that is comprised of one or more processors in communication with one or more electronic memories storing instructions to specially configure the processors to implement the method.

Figure 2:
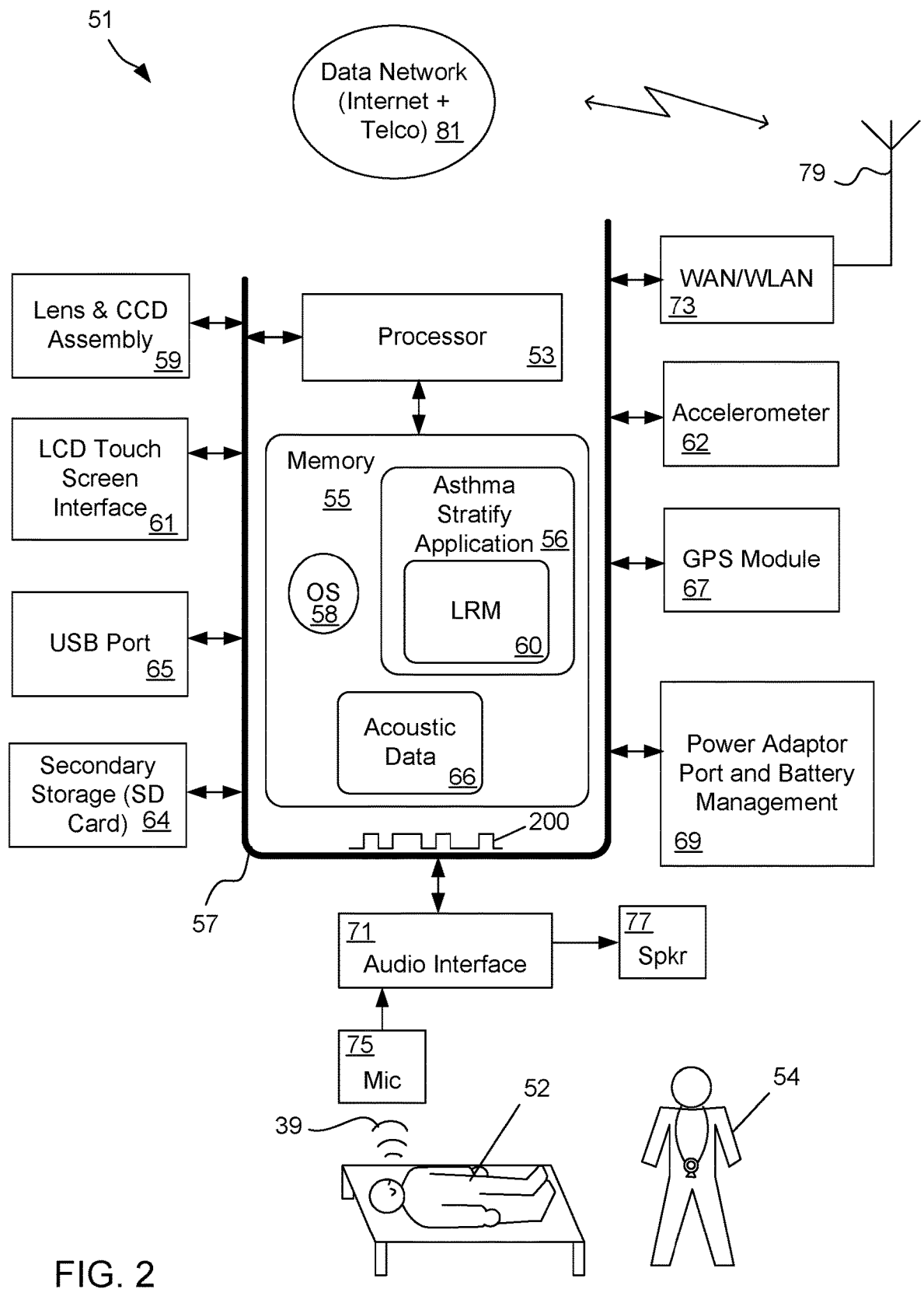
FIG. 2 is a block diagram of an asthma severity machine for presenting asthma severity of a patient.

FIG. 2 is a block diagram of an asthma stratifying machine 51 implemented using the one or more processors and memory of a smartphone. The asthma stratifying machine 51 includes at least one processor (or as it may be referred to simply "the processor") 53 that accesses an electronic memory 55. The electronic memory 55 includes an operating system 58 such as the Android operating system or the Apple iOS operating system, for example, for execution by the processor 53. The electronic memory 55 also includes an asthma stratifying software product or "App" 56 according to a preferred embodiment of the present invention. The asthma stratifying App 56 includes instructions that are executable by the processor 53 to thereby specially configure processor 53 in order for the asthma stratifying machine 51 to process sounds from a patient 52 and present a classification of the severity of asthma of the patient 52 to a clinician 54 by means of LCD touch screen interface 61. The App 56 includes instructions for the processor 53 to implement a pattern classifier such as a trained predictor or decision machine, which in the presently described preferred embodiment of the invention comprises a specially trained Logistic Regression Model (LRM) 60. It will be realised that in other embodiments other suitable decision machines may be implemented by processor 53 under control of App 56, such as an artificial neural network or a Bayesian decision machine.

Figure 3:
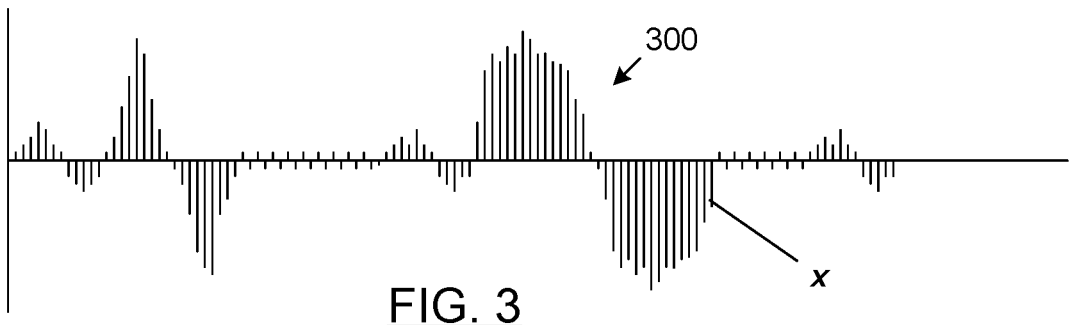
FIG. 3 is an exemplary digital waveform corresponding to patient sound captured by the machine of FIG. 2.

The processor 53 is in data communication with a plurality of peripheral assemblies 59 to 73, as indicated in FIG. 2, via a data bus 57 which is comprised of metal conductors along which digital signals 200 are conveyed between the processor 53 and the various peripherals 59-73. Consequently, if required the asthma severity machine 51 is able to establish voice and data communication with a voice and/or data communications network 81 via WAN/WLAN assembly 73 and radio frequency antenna 79. The machine also includes other peripherals such as Lens & CCD assembly 59 which effects a digital camera so that an image of patient 52 can be captured if desired. The LCD touch screen interface 61 comprises a human-machine interface and allows the clinician 54 to read results and input commands and data into the machine 51. Accelerometer 62 detects acceleration associated with changes in position and orientation and provides corresponding data for processing by processor 53. A USB port 65 is provided for effecting a serial data connection to an external storage device such as a USB stick or for making a cable connection to a data network or external screen and keyboard etc. A secondary storage card 64 is also provided for additional secondary storage if required in addition to internal data storage space facilitated by Memory 55. Audio interface 71 couples a microphone 75 to data bus 57 and includes anti-aliasing filtering circuitry and an Analog-to-Digital sampler to convert the analog electrical waveform from microphone 75 (which corresponds to patient sound wave 39) to a digital audio signal 300 (shown in FIG. 3) which comprises acoustic data 66 that can be stored in memory 55 and processed by processor 53. The audio interface 71 is also coupled to a speaker 77. The audio interface 71 includes a Digital-to-Analog converter for converting digital audio into an analog signal and an audio amplifier that is connected to speaker 71 so that audio recorded in memory 55 or secondary storage 64 can be played back for listening by clinician 54.

In a preferred embodiment the asthma stratifying machine 51 is configured by App 56 as a machine for classifying severity of asthma (or as it may be referred to herein "stratifying asthma severity") in a patient with no requirement for external sensors, physical contact with patient 52 or contact with communication network 81. Furthermore, once the acoustic data 66 has been stored by machine 51, the machine 51 can then process the acoustic data to stratify asthma severity without any need for the patient to be present.

As previously discussed, although the asthma stratifying machine 51 that is illustrated in FIG. 2 is provided, in one embodiment, in the form of smartphone hardware uniquely configured by App 56 it might equally make use of some other type of processing assembly such as a desktop computer, laptop, or tablet computational device or even in a cloud computing environment wherein the hardware comprises a virtual machine that is specially programmed with App 56. Furthermore, a dedicated circuit asthma stratifying machine might also be constructed that does not make use of a general purpose processor. For example, such a dedicated machine may have an audio capture arrangement including a microphone and analog-to-digital conversion circuitry configured to store a digital audio recording of the patient in an electronic memory. The machine may further include a cough identification assembly in communication with the memory and arranged to process the digital audio recording to thereby identify portions of the digital audio recording comprising cough sounds of the patient. A cough segmentation assembly is provided that is responsive to the cough identification assembly and arranged to segment each identified cough into a number of segments. A feature extraction processor is provided in communication with the cough segmentation assembly and arranged to process each of the segments to generate segment feature values for each segment in respect of each of a number of characteristic features. The dedicated machine further includes a hardware implemented pattern classifier in communication with the feature extraction processor that is configured to produce a signal indicating the patient cough sound as being indicative of one of a number of degrees of asthma severity.

The procedure that asthma severity machine 51 uses to stratify severity of asthma in patient 52, and which comprises instructions that make up App 56 is illustrated in the flowchart of FIG. 1 and will now be described in detail.

Figure 4A:
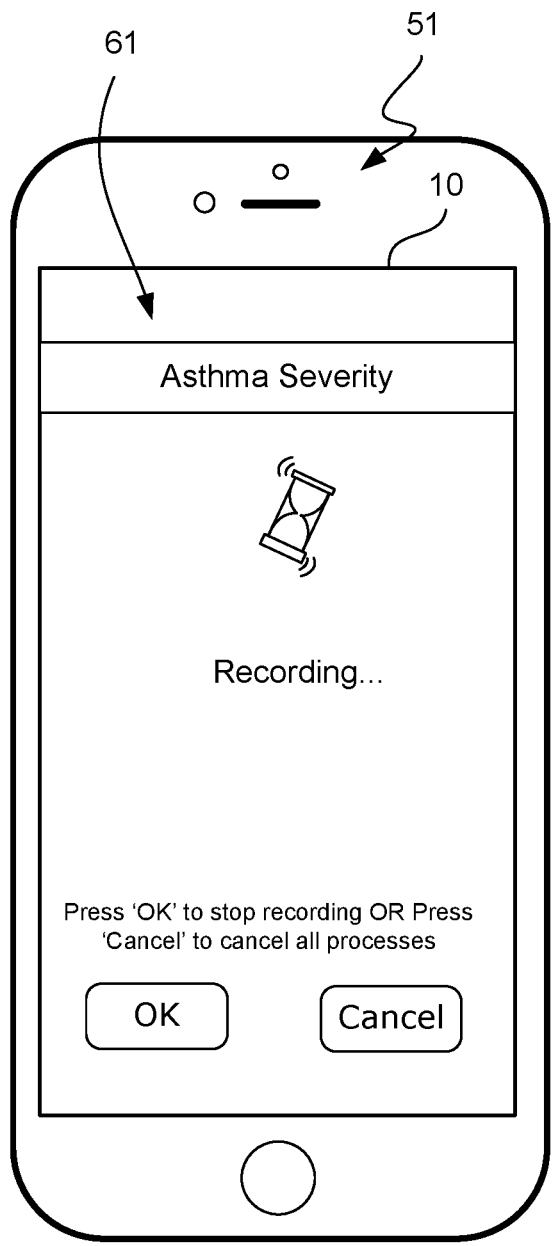
FIG. 4A is a view of the exterior of the machine of FIG. 2 whilst in operation recording the waveform of FIG. 3.

At box 3 the sound 39 from the mouth of the patient 52 is recorded by microphone 75 and digitized by the audio interface 71 to produce a digitized signal 300 (illustrated in FIG. 3) that is conveyed to processor 53 along bus 57. Typically, the microphone 75 is placed proximal to the patient's mouth, e.g. within a meter though depending on the directionality of the microphone and background noise levels the distance may be varied whilst still ensuring capture of the patient sounds occurs. Signal 300 comprises digitized patient sound data that is recorded from patient 52 at sampling frequency Fs which is typically 44.1 kHz at 16 bit resolution, and stored as acoustic data 66, for example as a file, in memory 55 of the asthma severity machine 51. During the recording procedure at box 3 processor 53 operates LCD touch screen interface 61 to display a recording message screen 10 as illustrated in FIG. 4A. Clinician 54 continues the recording procedure until at least one cough, and preferably more than one cough, has been captured from patient 52. Once clinician 54 is satisfied with the number of coughs that have been captured then the clinician presses the "OK" button on screen 10 so that the recording stops and processor 53 proceeds to box 4 of the flowchart of FIG. 1. The patient need not be present for any of the operations described in boxes 4 to 27.

Figure 4B:
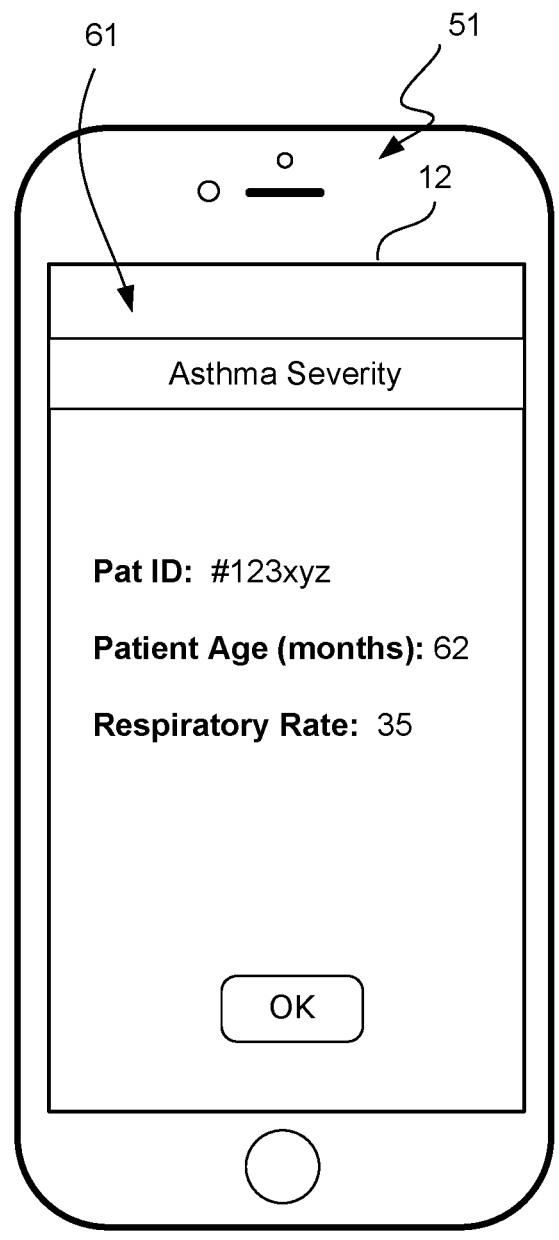
FIG. 4B is a view of the exterior of the machine of FIG. 2 presenting a screen for input of patient respiratory rate and age.

At box 4 processor 53 operates LCD Touch Screen Interface 61 to display screen 12 as shown in FIG. 4B for clinician 54 to input the age of patient 52 in months along with the patient's respiratory rate. The patient age and the respiratory rate value will later be used at box 21 for the processor 53 to calculate a Breathing Index value. It is possible to omit the steps of capturing the Respiratory Rate and Patient Age data at box 4 and of calculating the Breathing Index at box 21. However such an omission results in the method being unable to reliably classify a patient as suffering from one of three classifications, being "mild", "moderate" or "severe" asthma but only able to discriminate between two classifications, namely "mild" or "moderate to severe"

Figure 5:
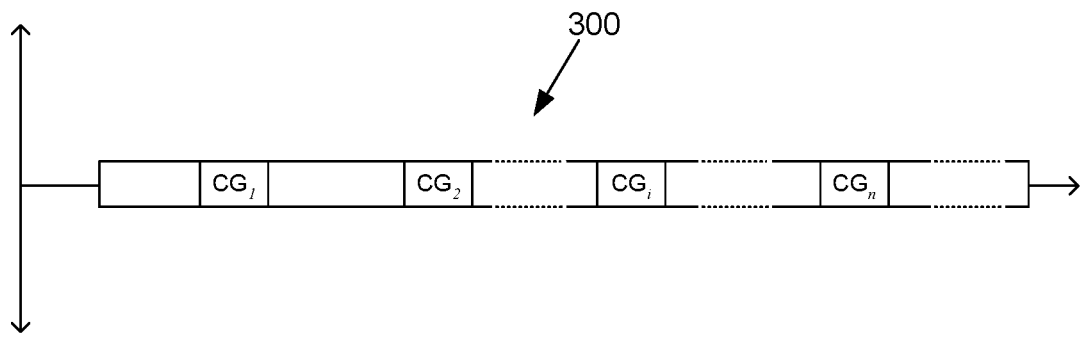
FIG. 5 is a graph showing portions of a recording of patient sound identified by the machine of FIG. 2 as being cough sounds.

At box 5 the processor 53 processes the digitized sound recording 300 of patient 52 that was captured at box 3 to identify coughs $CG_1, \ldots, CG_n$ in the sound recording as indicated in FIG. 5. Procedures for identifying cough sounds are known in the prior art, for example in U.S. Pat. No. 10,098,569 to the present applicant, the disclosure of which is hereby incorporated by reference.

At box 7 the processor 53 determines if all of the identified cough sounds $CG_1, \ldots, CG_n$, have been processed by the subsequent processing boxes in a manner that will shortly be explained. Since initially no cough sounds have been processed control diverts from decision box 7 to box 9. At box 9 the processor 53 computes one or more overall cough sound feature values of the current cough sound for each of one or more characteristic features. In the presently described embodiment the overall cough sound feature values are the values W1, . . . , W13 of thirteen wavelet features based on the Morlet wavelet as detailed in Kosasih, K., U. R. Abeyratne, and V. Swarnkar, *Wavelet augmented cough analysis for rapid childhood pneumonia diagnosis*. IEEE Trans on Biomed Eng., 2015. 62 (4): p. 1185-1194, the content of which is hereby incorporated by reference in its entirety.

Figure 6:
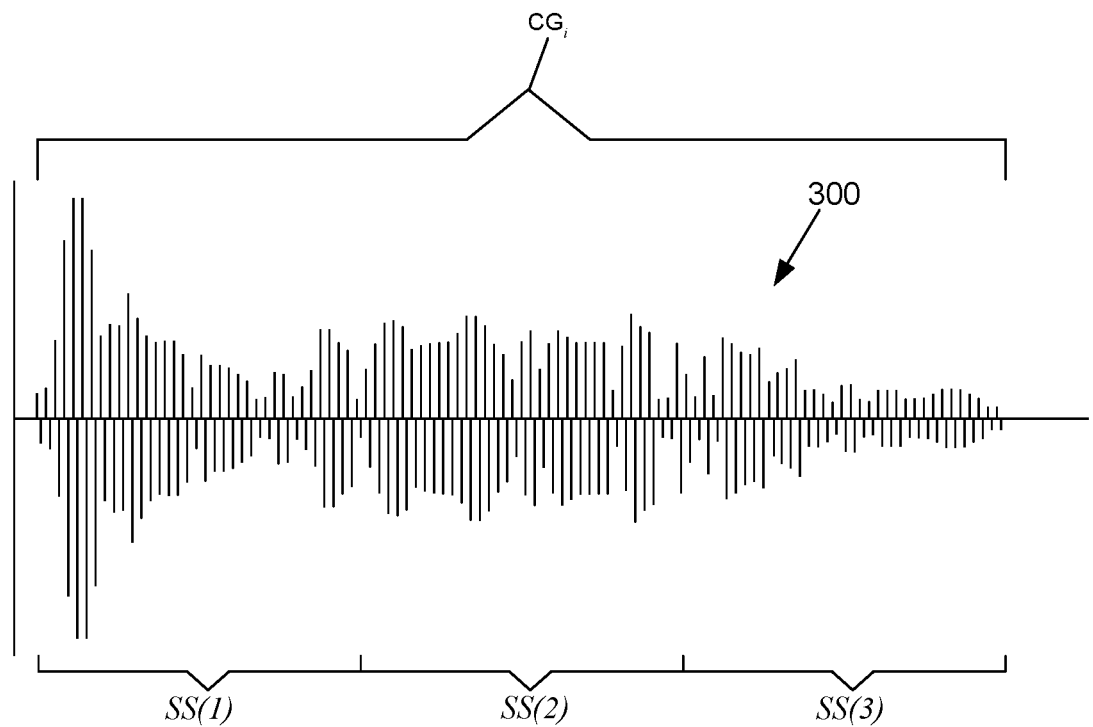
FIG. 6 is a graph showing a cough sound from FIG. 5 in detail and segmented into three segments.

At box 11 the processor 53 segments the current cough Sound $CG_i$ into three segments SS(1), SS(2) and SS(3) as illustrated in FIG. 6. In the presently described embodiment there are three segments and they are each non-overlapping. Whilst this is believed to be the best segmentation scheme the procedures that follow might be used with a different number of possibly overlapping segments in other embodiments At box 13 the processor checks if all three of the segments SS(i) have been processed in the following boxes 15 and 17. Since initially no cough sounds have been processed control diverts to box 15.

At box 15 the processor 53 applies known algorithms to determine feature values for at least one of a number of features in respect of the current segment SS(i). In the presently described embodiment the values that are computed are as follows: Bispectrum Score (BGS), Non-Gaussianity score (NGS), the first four formant frequencies (FF), log energy (LogE), zero crossing (ZCR), kurtosis (Kurt), and twelve Mel-frequency cepstral coefficients (MFCC). The algorithms that are used by processor 53 comprise part of the instructions that make up App 56 and are documented in Abeyratne, U. R., et al., *Cough sound analysis can rapidly diagnose childhood pneumonia*. Annals of Biomedical Engineering, 2013. 41(11): p. 2448-2462, the disclosure of which is hereby incorporated by reference in its entirety.

For each cough segment SS(i) the processor generates 21 characteristic feature vales at box 15 as set out in Table 2 below:

TABLE 2

| Feature | Number of Values |
|---|---|
| BGS | 1 |
| NGS | 1 |
| FF1, . . . , FF4 | 4 |
| LogE | 1 |
| ZCR | 1 |
| Kurt | 1 |
| MFFCC1-MFCC12 | 12 |
| Total: | 21 |

It will be realized then that in the presently described embodiment the total number of feature values that are calculated for each cough are 3 (Segments)×21 (Values per segment)+13 (Wavelet Features for each overall cough)=76 features in total.

At box 17 the processor 53 stores the values for the current segment into a data structure, for example a vector array that is resident in an allocated portion of memory 55 and which comprises a 1×73 array of real values that represent components of a cough feature vector Fc.

Once all of the segments of the current cough have been processed, so that components comprising the cough feature vector Fc have been populated with the values, then control diverts from decision box 13 to box 21. As previously alluded to, at box 21 processor 53 calculates a breathing index BI from the respiratory rate (RR) and patient age data that was captured earlier at box 4.

The BI is defined as:

BI=RR−20 (if Age>=60 months)

BI=RR−40 (if Age<60).

So, for example, if the age is 45 months and RR=60 then

BI=60−40=20

For age=45 months and RR=38 then

BI=38−40=−2

It is preferable that all the values that are captured for all features are normalized across the population. That is, a feature, say BI, is made zero mean and unity variance by giving it a transformation of the type, Normalised Feature=(Feature−mean(Feature))/standard_deviation(Feature)

Before applying the feature value to the classifier. Any new subject to be classified is preferably processed through these normalisation equations.

The previously cited paper Abeyratne, U. R., et al., *Cough sound analysis can rapidly diagnose childhood pneumonia.* Annals of Biomedical Engineering, 2013. 41(11): p. 2448-2462 discusses the development of the Breathing Index.

As an alternative to the clinician 54 directly inputting the respiratory rate, in other embodiments the machine 51 may be programmed to obtain an estimate of the breathing rate. For example, the machine 51 may be programmed so that when the machine is placed on the patient's chest it analyses signals from the accelerometer 62 to determine the respiratory rate. In another embodiment the machine 51 is programmed so that when microphone 75 is placed under the nose/mouth of patient 52 the processor 53 detects breath sounds from the patient and produces a respiratory rate estimate. In another embodiment the Lens and CCD assembly 59 is positioned to capture images of the rising and falling of the chest of patient 39 and microprocessor 53 is programmed to produce a respiratory rate from the images.

At box 23 the processor 53 forms a test vector T that is stored in a 1×(76+1 (BI)+13 ($W_i$))=1×90 array data structure that is resident in an allocated portion of memory 55. T includes all 76 components of the Fc cough vector and also components corresponding to the breathing index value BI and the thirteen wavelet values that were calculated at box 9.

At box 25 the processor 53 applies the test vector T to a pre-trained classifier in the form of Logistic Regression Model (LRM) 60 that it implements in accordance with instructions comprising App 56. Logistic Regression Model 60 has been trained to classify the test vector T as indicating one of a number of degrees of asthma severity. In the presently described embodiment the Asthma Severity Machine 51 classifies each cough as one of three degrees of severity namely "mild", "moderate" and "severe". A method for training the LRM 60 will be discussed in a subsequent section of this specification.

As briefly mentioned previously, in other embodiments the processor 53 does not carry out boxes 4 and 21 so that the respiratory rate and patient age are not recorded and the Breathing Index is not calculated. Consequently the test vector T only includes features that have been obtained by processing cough sound and cough sound segments. Such an embodiment has been found to perform well at deeming the patient cough sound to indicate one of "mild" or "moderate to severe" degrees of severity of asthma in the patient but is not indicated for indicating one of "mild", "moderate" and "severe" degrees of asthma severity.

Furthermore, in another embodiment the boxes 13 to 17 are not implemented by the processor. Instead the test vector T is formed either from the $W_i$ alone, for discriminating between"milid" and "moderate to severe" or the $W_i$ and BI values for discriminating between "mild" and "moderate" and "severe".

Control then reverts back to box 7 and the process that has been described repeats until all segments of all coughs that have been identified have been processed and tested for asthma severity. Once all the cough sounds have been processed control then diverts from decision box 7 to box 27.

Figure 7:
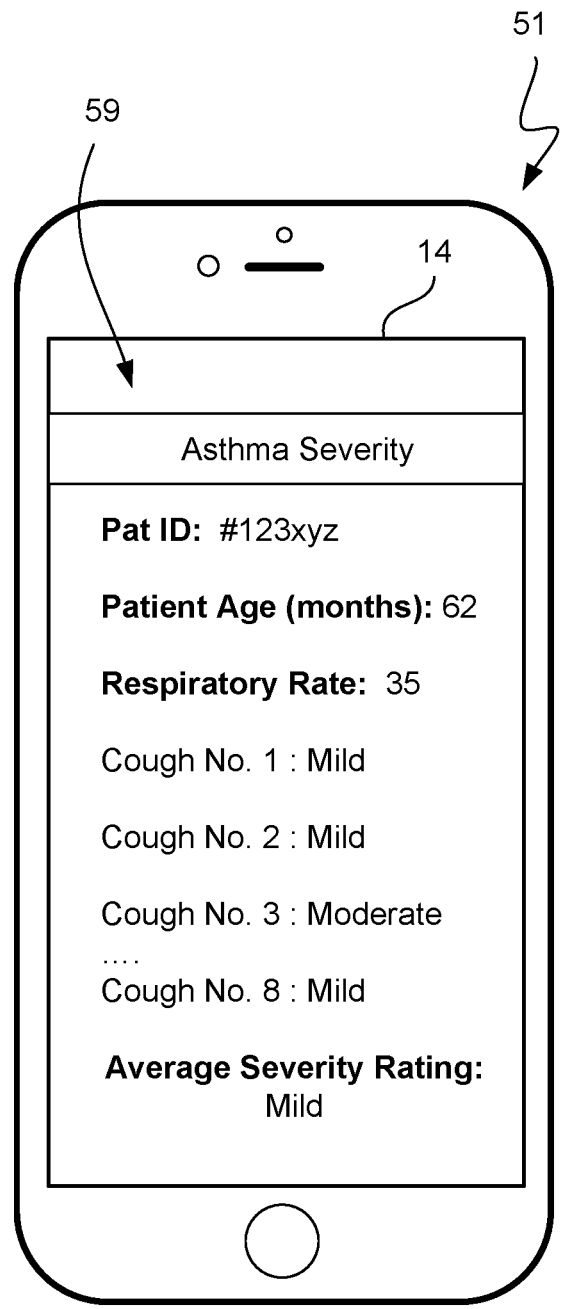
FIG. 7 is a view of the exterior of the machine of FIG. 2 presenting a screen showing a cough severity rating for each cough and an average severity rating overall.

At box 27 the processor 53 operates LCD touchscreen interface 61 to generate screen 14 on machine 51 as shown in FIG. 7. Screen 14 displays a severity rating for each cough that has been identified, taking into account Breathing Index. For example Cough No. 1 is shown to have a "Mild" severity and Cough No. 3 is shown to have a "Moderate" severity. An average severity rating is also presented, e.g. Average severity rating "Mild", being an average severity over all of the coughs. In this particular example none of the coughs were classified as "Severe" although such classification is possible.

The manner in which the LRM 60 of FIG. 2 is pre-trained will now be discussed commencing with a discussion of clinical case definitions.

a) Acute Asthma: The Inventors defined acute asthma as a respiratory event in a child with wheeze, or a silent chest, during auscultation responsive to a Bronchodilator Test (BT). A BT consisted of the administration of Salbutamol MDI via spacer up to 3 times over one hour at the following doses: 6 puffs for children<6 yrs, 12 puffs for children>6 yrs.

b) Asymptomatic individuals: This group was defined as children with no acute respiratory complaints or clinically discernible respiratory symptoms at the time of recruitment as determined by clinical judgement. By definition, all subjects in the asymptomatic group had a PS score of 0. As expected in the cross section of a general population, this group consisted of:

i) subjects who reported no previous history of asthma;
   ii) subjects who reported a history of chronic asthma but who were currently taking prophylactic medication;
   iii) subjects who reported a history of chronic asthma but who were not currently taking prophylactic medicine.

The clinical panel confirmed acute asthma diagnosis after review of all clinical records, including BT responsiveness and investigations. Parents/caregivers reported asthma history and current preventer medication use.

Cough Recording:

The recording device was an iPhone™ 6 (Apple, California, USA) held proximal the patient, namely 25-50 cm away from the mouth in the present embodiment, with the microphone angled towards the subject at 45 degrees [14]. Sound data was recorded at a sampling rate of Fs=44.1 kHz with a 16-bit resolution. A pediatric research nurse undertook recordings in realistic hospital environments where background noises included talking, crying, medical devices, footsteps and doors. Care was taken not to record coughs from other people or in the presence of preventable interferences such as television sounds or loud conversations. However; some recordings contained interferences unavoidable in the medical environment.

A minimum of five spontaneous or voluntary coughs were recorded from each child. Children under two years could only provide spontaneous coughs. Other children with respiratory diseases gave voluntary and/or spontaneous coughs.

Asymptomatic volunteers could provide only voluntary coughs in the obvious absence of spontaneous coughs.

Calculation of PS Scores

PS scores were calculated for all individuals according to the criteria shown in Table 1 (set out in the Background section of this specification). Judgement of the degree of accessory muscle (AM) use and the wheezing characteristics were made by paediatricians and paediatric nurses experienced in using the PS system.

The Clinical Dataset:

The dataset was divided into the following groups (Table 3):

i. Acute Asthma ($Y$): Let $Y_{i\text{-}j}$ represent the set of contiguous PS values given by $Y_{i\text{-}j}=\{PS=i, i+1, \ldots, J\}$. In this work The Inventors considered three different subgroups symbolized by $Y_{5\text{-}9}$, $Y_{2\text{-}4}$ and $Y_{0\text{-}1}$. The first subgroup (PS 5-9) $Y_{5\text{-}9}$ which included subjects with PS=\{5,6,7,8,9\} represented severe airway restriction; the $2^{nd}$ subgroup (PS 2-4) $Y_{2\text{-}4}$ represented moderate restriction with PS=\{2,3,4\} and the $3^{rd}$ subgroup $Y_{0\text{-}1}$ (PS 0-1) symbolized mild (or insignificant) restriction with PS=\{0,1\}. These three subgroups were demarcated as such to represent distinct groupings which would require different clinical management.

ii. Asymptomatic ($N$): The Inventors divided subjects with no active disease (PS=0) into three subgroups: $N_{NH}$=\{those without a history of viral wheeze/asthma\}, $N^{NP}{}_{AH}$=\{those with a history of viral wheeze/asthma but not taking any preventer medications at the time of recruitment\}, and $N^{P}{}_{AH}$=\{those with a history of viral wheeze/asthma and taking preventer medications at the time of recruitment\} to ascertain whether different histories or medication use affect the classification. At the time of recruitment, these subjects had no respiratory complaints or clinically discernible respiratory signs. These three groups would be considered identical (ie asymptomatic, PS=0) when being assessed for the presence of acute asthma in a clinical setting.

Training Set (G1): Cough-Based PS Classifier Design and Cross-Validation

Due to its dependence on subjective and difficult measurements, the PS, as estimated by the clinical process, can only be considered a gross measure.

Taking this into account the Inventors initially trained a Logistic Regression (LR) classifier with the target of separating the subjects in $Y_{5\text{-}9}$ from that of the combined group $\{Y_{0,1}+N^P{}_{AH}\}$. The group defined by G1= $\{Y_{0,1}+N^P{}_{AH}30\ Y_{5\text{-}9}\}$ (n=60) is the model training and validation set comparing PS 0-1 to PS≥5. The Inventors used a leave-one-out cross validation method to develop and validate the models, which involves using data from all the patients in G1 except one to train the model and cough events from the remaining patient to validate the model. This process was systematically repeated such that each patient in G1 is used once as the validation subject. LR is a linear model, which uses several independent features to estimate the probability of a categorical event (dependent variable). The Inventors set the dependent variable Y=1 when there is a subject in G1 belonging to $Y_{5\text{-}9}$, and set Y=0 otherwise.

A model is derived using a regression function to estimate the probability of Y given the independent input features (i.e. $F_{ca}=\{f_{0c}, f_1, f_2, \ldots f_f\}$) as:

$$Prob(Y) = \frac{e^z}{e^z + 1} \quad (1)$$

$$z = \beta_0 + \beta_1 \cdot f_{0c} + \beta_2 f_2 + \beta_{n-1} f_F \quad (2)$$

The function in (1) gives a continuous output of probabilities. A decision threshold to determine if a given subject belongs to $\{Y_{5\text{-}9}\}$ or $\{Y_{0,1}+N^P{}_{AH}\}$ was computed using the Receiver Operating Curve (ROC).

In an embodiment the method of extracting the input cough features is summarized below:

(i) Let x denote a discrete time sound signal from an arbitrary cough event.

(ii) Segment x into three equal-sized non-overlapping segments. Let $x_i$ represents the $i^{th}$ segment of x, where i=1, 2, 3. From each segments $x_i$ compute the following features [12]: Bispectrum Score (BGS), Non-Gaussianity score (NGS), the first four formant frequencies (FF), log energy (LogE), zero crossing (ZCR), kurtosis (Kurt), and twelve Mel-frequency cepstral coefficients (MFCC).

(iii) Using the whole cough event x, compute 13 wavelet features based on the Morlet wavelet as detailed previously [13].

A total of 76 features were extracted from each cough event to form a feature vector $F_c$.

In relation to point ii) above, i.e. segmenting the cough event into three segments, the motivation for segmenting the cough in that manner will now be discussed. The Inventors realized that a cough consists of several physiological phases. Initially, air is breathed in (in-breath) and then the glottis is closed with a high pressure differential being generated across the closure (phase 1-3). Then the glottis is opened resulting in a rapid explosion of air creating the sound that is heard as a cough. The cough (main bang of the sound) was considered to have three diagnostically important sub-sections. The rising part, the middle and the tail. In the rising part, sound energy is created starting from a small level (intensity) rapidly rising near the maximum; in the middle part it is largely the slower (smaller) rise towards the peak energy and then another slower (smaller) decrease from the peak level. In the third component ("tail") several characteristics were observed such as a slow, sustained decay to a lower energy level sometimes interrupted by a second, smaller bang (what may be called a 'cough-grunt'). The Inventors discovered during their research program, that the best diagnostic outcomes were achieved when coughs were divided into three segments and analyzed, compared to a lower number of segments or higher. The decision to use three segments is based on that realization.

In addition, the Inventors were guided by physics-based considerations. In the first two segments of the main bang of a cough, a larger part of the sound is generated in the upper airway. In the tail section of the cough, in the context relative upper-airway silence, the acoustics response of the lower airway response may be observed in different details. This is not to say the Inventors did not see lower-airway features in the first two segments but it is likely the tail end of a cough will carry information on deeper parts of the airway. The Inventors were surprised to find "wheeze" in a cough as to the best of their knowledge no other researcher has previously reported stated such a finding. Wheeze is usually defined via breath sounds, not cough.

In asthma, airways narrow down due to smooth muscle contraction, thus changing the internal size of the airways and also the muscle tone. Narrowed-down airways resonate when air passes through them at certain speeds, generating sounds with sufficient intensities to reach the outside the lungs. Lower rates of lung air clearance can result in a 'longer' cough and also a longer tail. Wheeze (airway whistling) can also be present in a cough for this reason. The Inventors analysis of segmented coughs helps in catching those thereby allowing the Inventors to characterize the asthmatic airway. The Inventors hypothesize that diseases such as emphysema (which contributes to COPD) causes a collapse of alveoli, small spherical sacs that are at the deepest end of the respiratory tract. The lung losses elasticity, affecting the recoil mechanism which partially "powers" a cough. The Inventors hypothesize that it is likely the front segments of a cough carries information on this.

Another signal processing related consideration was that embodiments of the method involve estimating mathematical features such as MFCCs, formants and bispectrum. Dividing a cough into segments before calculating these helps to better maintain the stationarity of the signal.

Nevertheless, the Inventors also discovered that it is possible for a less preferred embodiment of the method to work without the segmentation.

In relation to using the whole cough event x, to compute thirteen wavelet features based on the Morlet wavelet there is no need to maintain stationarity. Non-segmentation reduces the number of parameters that must be dealt with, and also gives the wavelets a better opportunity to represent the whole cough signal. When wavelets are extracted on the overall cough sound for example the segmentation need not be performed in some embodiments.

The Inventors trained LR models using several different approaches. In the simplest form, The Inventors used only cough features for LR training. To investigate the relative importance of the individual clinical sub-components on the overall clinical PS (Table 1), The Inventors also developed LR models using RR, wheeze severity and AM as individual inputs. Finally, The Inventors augmented cough features with information derived from the respiratory rate, on the basis that such information will be readily reportable by patients or guardians even in a home setting. On the contrary, AM and wheeze severity estimation require clinical respiratory expertise and are not reportable by laypersons. Since it was desirable to develop a community deployable technology, The Inventors saw no purpose in using AM or wheeze severity to augment cough features.

In the LR models, The Inventors transformed the RR into another feature, the Breathing Index (BI) defined as [12], BI=RR>20 breaths per minute for age over 60 months, and BI=RR>40 breaths per minute otherwise. This was based on inspiration The Inventors drew from the WHO/IMCI algorithm for classifying childhood pneumonia in resource-poor regions. Normative RRs for younger children are known to be higher than those of older children, and the BI attempts to codify that. In our models, the AM use was graded as per the PS scoring system into none, mild increase, increased and maximal activity as determined by experienced clinicians (table 1).

Independent Testing Set (G2):

Once the LR model training was finished following leave one out cross-validation process, one model was selected following the philosophy in [12]. The Inventors fixed the parameters of this model and tested it on a hitherto unused test set: $G2=\{Y_{2-4}+N^{NP}_{AH}+N_{NH}\}$ (n=164) representing subjects with moderate disease and individuals with no clinically discernible disease. Note that sets G1 and G2 are mutually exclusive. The definition of G2 makes the independent testing a particularly rigorous one. Subjects in $Y_{2-4}$ are previously untested by the models, as are subjects in $N^{NP}_{AH}+N_{NH}$ comprising clinically-normal subjects reporting different disease/medication histories to those in the training set. The discriminatory ability of the algorithm to separate cases with similar disease severity (ie no disease vs mild/ moderate), which are difficult to discern in clinical practice, is bolstered by the fact that the data used in the second test is hitherto untested data. For these reasons, the results set forth below are likely to be an underestimation of the true discriminatory power of the embodiment that has been discussed with reference to FIG. 1.

RESULTS

Study Population:

224 subjects were included for analysis of which 103 had no acute respiratory disease, and 121 had acute asthma. Table 3 describes the subject demographics, cough characteristics and separation into training and testing groups. No subjects with PS>7 were enrolled as they met the exclusion criteria of medical instability. The Inventors analysed a total of 3161 cough episodes.

The ages of subjects in the asymptomatic group were significantly older than the asthmatic group as a whole (p<0.0001). There was no age difference between asthmatic subjects with PS=0,1 and PS 2-4 (p=0.45) nor between the groups PS=2-4 and PS≥5 (p=0.15).

TABLE 3

Subject Demographics and Cough Characteristics

| Patient Subgroup | n | Age (months ± SD) | Male:Female | Total Coughs |
|---|---|---|---|---|
| Asymptomatic (no active disease) | 103 | 100.5 ± 28.0 | 64:39 | |
| $N_{NH}^{\#}$ | 64 | 103.31 ± 29.00 | 40:24 | 781 |
| $N_{AH}^{NP\#}$ | 19 | 113.95 ± 31.69 | 9:10 | 259 |
| $N_{AH}^{P*}$ | 20 | 80.70 ± 22.01 | 15:5 | 204 |
| Acute Asthma | 121 | 62.3 ± 29.9 | 79:42 | |
| $Y_{0,1}^{*}$ | 17 | 69.06 ± 21.07 | 14:3 | 276 |
| $Y_{2-4}^{\#}$ | 81 | 63.61 ± 31.25 | 50:31 | 1285 |
| $Y_{5-9}^{*}$ | 23 | 52.83 ± 32.14 | 15:8 | 356 |

\* G1 (training and validation set),
\# G2 (independent testing set)

Leave-One-Out Validation Results for Training Set G1 (Table 4):

The LR model based on cough features alone was able to separate groups PS≥5 from PS≤1 with a sensitivity of 82.61% and specificity of 78.38%. The results show that cough sounds carry information for the separation of these PS groups.

As expected by their being components of the clinical pulmonary score, BI and AM use also independently separated groups PS≥5 and PS≤1. BI alone achieved similar results to cough analysis alone (sensitivity 69%, specificity 81%). The addition of cough features to BI improved sensitivity to 91% and specificity to 97%. AM use on its own achieved sensitivity of 100% and specificity of 94% which was not enhanced by the addition of the cough model. Since AM use is rarely seen in mild asthma but is always present in severe asthma, it is not surprising that this component of the PS performed well in this context. AM-use requires considerable clinical expertise to determine and is thus not practicable as a feature to estimate PS in community settings which lack the necessary clinical expertise. As it is desirable to target community deployment, The Inventors saw no further utility for discriminating disease severity based on AM-use.

TABLE 4

Training set (G1) - Leave-one-out validation results for separating subjects with PS ≥ 5 from the subjects with PS ≤ 1.

| Diagnostic features | Sensitivity % | Specificity % | Accuracy % |
|---|---|---|---|
| Cough | 82.61 | 78.38 | 80.00 |
| Breathing Index | 69.57 | 81.08 | 76.67 |
| Accessory muscle use | 100.00 | 94.59 | 96.67 |
| Breathing Index + cough | 91.30 | 97.30 | 95.00 |

Independent Testing Set G2 Results:

The ability to discriminate no disease from mild/moderate disease is an integral part of clinical practice and more difficult due to the overlap in disease severities. To investigate the performance of the LR models in separating PS 0 from PS 2-4 (moderate disease), The Inventors picked one LR model and tested it on the independent test set G2 $\{Y_{2-4}+N^{NP}_{AH}+N_{NH}\}$. The aim was to examine whether the continuous output of the trained LR function in (1) shows any relationship to PS values for moderate disease. Two different groups of asymptomatic subjects (PS=0) were pooled for this analysis ($N_{NH}$ and $N^{NP}_{AH}$), neither of which had been used in the G1 test set. The use of two datasets tests the discriminatory ability of the algorithm to detect subclinical respiratory symptoms.

Table 5 shows the LR output (means and SD) for all PS values. FIG. 1 shows the LR output from each model tested (means and 95% CI). Though the LR models were trained to separate the subjects with PS≥5 from subjects with PS≤1, its output also responds appropriately to PS 2-4 and asymptomatic subjects, $N_{NH}$ and $N^{NP}_{AH}$.

TABLE 5

Output of the logistic regression model for different PS values (mean ± SD)

| | Diagnostic features | | | |
|---|---|---|---|---|
| PS | Cough only | Breathing Index | Accessory muscle use | Breathing Index + cough |
| | G1: Leave-one-out validation training set | | | |
| 0 | 0.26 ± 0.26 | 0.21 ± 0.13 | 0 ± 0 | 0.12 ± 0.23 |
| 1 | 0.38 ± 0.26 | 0.40 ± 0.22 | 0.03 ± 0.16 | 0.24 ± 0.30 |
| 5 | 0.62 ± 0.31 | 0.55 ± 0.32 | 0.09 ± 0.27 | 0.72 ± 0.35 |
| 6 | 0.64 ± 0.28 | 0.65 ± 0.25 | 0.93 ± 0.04 | 0.84 ± 0.26 |
| 7 | 0.37 ± 0.33 | 0.93 ± 0.02 | 0.94 ± 0.04 | 0.84 ± 0.30 |
| | G2: Independent testing set | | | |
| 0 | 0.31 ± 0.31 | 0.22 ± 0.10 | 0 ± 0.0 | 0.18 ± 0.30 |
| 2 | 0.52 ± 0.31 | 0.34 ± 0.25 | 0.58 ± 0.44 | 0.49 ± 0.40 |
| 3 | 0.51 ± 0.30 | 0.37 ± 0.27 | 0.78 ± 0.33 | 0.51 ± 0.40 |
| 4 | 0.57 ± 0.30 | 0.37 ± 0.26 | 0.92 ± 0.02 | 0.57 ± 0.40 |

The cough-only model independently discriminated asthma severity of mild (PS 0-1) from moderate (PS 2-4). However, the performance degraded beyond PS = 5 (table 5).

BI alone did not discriminate between PS 0-1 and PS 2-4 however; it did differentiate the combined group PS 0-4 from PS≥5. The addition of BI to cough-based mathematical features allowed clear separation of the three groups PS 0-1, PS2-4 and PS≥5 (FIG. 1).

AM use alone was the best single clinical parameter in separating the PS<4, however, did not differentiate above this level. (Table 5, FIG. 1).

Figure 8:
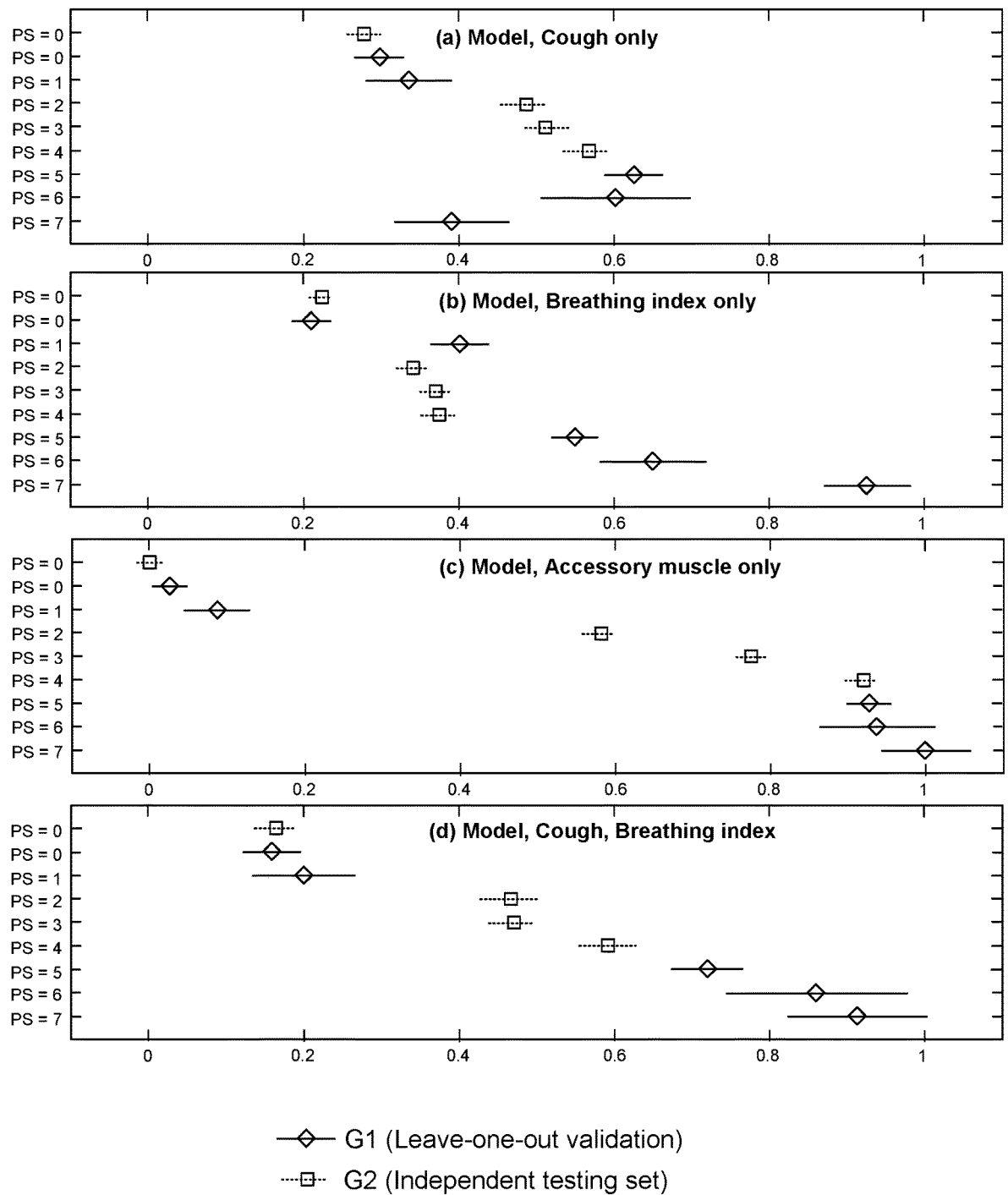
FIG. 8 comprises four graphs showing the confidence intervals for each of four differently trained Logistic Regression Models for diagnosing asthma severity.

FIG. 8 depicts the mean logistic regression output with 95% confidence intervals (horizontal bars) for subjects with different PS scores. The number of data points at the PS values 0(G1), 0(G2), 1, 2, 3, 4, 5, 6, 7, 8, 9 are 333, 1040, 147, 387, 476, 422, 233, 54, 69, 0, 0. Smaller number of data points at PS=6, and 7 contributed to the larger confidence interval (CI).

It may be observed from FIG. 8 that no difference was found between the LR outputs of the two asymptomatic groups (PS=0: G1 and G2). These two groups differed significantly in age (mean difference 22 months, SE 7, p<0.0022) however the LR outputs did not differ for the cough only, clinical features only or combined cough and clinical features models.

IV. Discussion

Results from 224 patients demonstrated that cough carries useful information on asthma severity. The Inventors have developed a cough-only model that is an accurate reflection of PS in children with no, mild and moderate asthma (PS 0-5). Model performance degraded above PS 5 and required a single simplified component (respiratory rate) of the original PS to correct. In severe asthma, airway obstruction can increase to a point where little air can pass through the airways making such areas relatively opaque to acoustical analysis. In such cases, auscultation may similarly fail to detect wheeze. This is accounted for in the original PS where those without wheeze due to minimal air exchange are given a maximum score. Similar to the cough analytic method, the PS scale has been reported to correlate better with lesser degrees of airway obstruction [9].

When cough features were appended with routinely acquired clinical features that do not require auscultation or clinical training (wheeze severity and AM use assessments), the performance of the model improved significantly at higher PS values. Clinical signs in the PS (RR, AM use) reflect respiratory effort, which is greater in more severe obstruction until fatigue occurs. Adding RR (as BI) to the algorithm provided further separation of severe from moderate and mild asthma; important case distinctions which align with specific therapeutic pathways [10]. The algorithm is thus trained to recognise that the combination of a silent chest (opaque acoustic signature) and a significantly elevated BI in an asthmatic indicates increased levels of airway obstruction. The PS and algorithm both take into consideration the age-dependent variability in BI when determining the degree of disease severity.

Grading acute asthma severity is an integral component of disease management. Clinical care protocols rely on accurate assessments and scoring systems such as the PS are used to help with decisions such as treatment initiation and response, level of clinical monitoring, hospital triage/admission, and discharge planning. However, many scales have not been adequately evaluated and rely on the subjective evaluation of signs such as wheeze characteristics and inspiratory/expiratory wheeze ratios. A systematic review of 64 studies concluded that none of the tested paediatric asthma scores had been appropriately validated [7]. Similar conclusions have been found in preschool-aged children [8].

Clinically, it is easier to discriminate severe from mild exacerbations as opposed to moderate from mild or absent disease. In practical terms, the determination of increased RR and AM use identifies severe exacerbations accurately, but these signs are less definitive in diagnosing the presence of mild disease. Mild exacerbations typically present with a minimal increase in RR and an absence of AM use, leaving wheeze assessment, a technique which requires considerable expertise, as the sole basis for therapeutic decision making. Also, the identification and grading of AM use require clinical training and is not usable by parents, caregivers or inexperienced clinicians. In contrast, the present model requires no input of additional clinical signs for moderate disease (below PS of 5) and only a simple RR count above this level.

Two groups of asymptomatic children were compared (PS=0). The Inventors wished to ascertain whether there were discernible differences in algorithm detection performance amongst asymptomatic individuals. The first group consisted of children with chronic controlled asthma on preventers while the second contained a group of children who had previously wheezed or who had never wheezed. No difference in the LR output between the groups was identified suggesting a lack of effect from subclinical airway disease in the population used by the Inventors.

There were several limitations to the study. There were fewer subjects with severe asthma (PS>5) compared to mild and moderate disease.

There are inherent problems in using the PS as a reference classifier due to subjectivity, poor validity, inter-rater reliability and reproducibility. For this reason, The Inventors elected to train the algorithm using the highest and lowest severity data and then the developed model was tested on lower acuity cases (PS<5). Due to the small numbers of subjects in these groups, it would be beneficial to undertake more extensive studies and also to evaluate the algorithm against objective measures of airway obstruction including FEV1 and PEFR where practical.

There were age differences in subjects with and without active disease but not between subjects with mild and moderate or moderate to severe acute asthma. The control group subjects were generally older than those with acute asthma due to difficulties in obtaining voluntary coughs from asymptomatic children under two years. However, children of any age with acute asthma exacerbations tend to cough spontaneously. The two groups of PS=0 (G1 and G2) differed significantly in age however it is interesting that the LR outputs did not differ, suggesting that age may not be an important variable in children without acute asthma. Accurately detecting the absence of asthma is important in clinical care and the decision whether to commence appropriate treatment.

The PS and other similar systems are routinely used in younger children despite only being validated in older groups due to difficulty in obtaining accurate lung function parameters. Embodiments described herein can be used at any age if the child is spontaneously coughing and from 2-3 years of age if voluntary coughs are required. This compares favourably with the lower age limit of 6-7 yrs for spirometry or peak flow measurements however the difficulty in comparing well-defined groups of different ages remains.

Embodiments herein provide an automated system that can be implemented using hardware of a smartphone specially configured by instructions of an App to perform a method such as that of the embodiment illustrated in FIG. 1. This offers advantages including accessibility, portability, and ease of use making it suitable for home monitoring and integration with asthma management plans. Asthma management plans, which are recommended in many schools and child-care centres, require caregivers to be able to promptly assess severity, based on their observations of wheeze characteristics, and evaluation of respiratory effort (RR and AM use). Measuring respiratory rate is easier for caregivers than assessing the degree of accessory muscle use or the extent of wheeze (Table I). Embodiments provided herein may improve the initiation and compliance with Asthma Action Plans as it only requires cough and RR assessment.

In addition, to use in traditional health care settings and community asthma action plans, there is potential for use in telehealth consultations during which there is no opportunity for clinicians to perform an examination. Respiratory illnesses account for more than 30% of telehealth consultations [16]. The measurement of RR could be easily added to a cough-based model as it is objective and readily calculated by parents, community healthcare workers or clinicians during a video-conference. It will also be of value in remote area medicine where access to trained clinical personnel is quite limited. In such areas, the routine of measuring breathing rates is well established in the hands of community healthcare workers using the WHO algorithm for detecting childhood pneumonia [17].

It will be observed that in the embodiments that have been discussed the classifier is trained using training vectors made up from features of cough sounds from low severity (mild) and highest severity (severe) patients but the trained classifier is then used to classify cough sound only data (i.e. excluding Breathing Index value) between moderate and low severity asthma sufferers.

A reason for that is that clinical estimation of Pulmonary Severity (PS) score is a difficult task affected by subjectivity. Clinicians have difficulty closely agreeing with each other even on a finding of wheeze. Thus the Inventors consider the reference PS itself as a gross index subject to inter personal variation so that it is not useful to attempt to accurately estimate PS. The Inventors believe that it is important is to be able to separate mild from moderate+severe PS, which is clinically most useful and difficult. Rather than trying to train model using a continuum of PS scores, the Inventors conceived that it would be best to use the extremes in training (i.e. the severe-extreme end and the mild-extreme), leaving the moderate components behind. This way, the Inventors were able to create a *reliable* region between the two extremes of PS. Mild and severe groups are less likely to be intermixed with each other due to clinical difficulties in PS estimations and thus it is possible to trust them more. In contrast, mild and moderate groups can be more intermixed due to the amount of clinical uncertainty and so are the moderate and severe. Thus, the Inventors trained on extremes. A higher logistic outputs score means it will be the severe PS, and a smaller output closer to 0, indicates it is the other end. Then the Inventors examined if they had built a scale that works in the moderate region as well, and found it to work, which was an important discovery.

It will be understood from the preceding discussion that the Inventors have conceived that cough carries significant information on asthma severity. In embodiments automated cough analysis alone separated mild from moderate disease with, in a further embodiment, the addition of a simple RR method enabling further separation of severe disease when compared to a common asthma severity scale (PS) used in Western Australian paediatric hospitals. Advantageously, embodiments discussed herein may assist with initial treatment, admission and monitoring decisions and in the community in the use of asthma action plans. Embodiments include provision of appropriate therapy and management, e.g. application of bronchodilator drugs to the patient, for example. Methods according to embodiments discussed herein are advantageous due to their objectivity and accessibility to caregivers of diverse expertise without the requirement for clinical training and expertise in assessing wheeze characteristics or AM use. Embodiments, either alone or in combination with RR, allows for prompt evaluation of asthma severity, which may translate into more explicit guidance on management, and which may be an improvement to existing asthma scoring systems.

The disclosures of each of the following references are each incorporated herein by cross-reference in their entireties.

REFERENCES

1. Henderson, J., et al., *Management of childhood asthma in general practice*. Aust Fam Physician, 2015. 44(6): p. 349-51.
2. Australian Institute of Health and Welfare, *Australian Burden of Disease Study: Impact and causes of illness and death in Australia 2011*, in *Australian Burden of Disease Study series no. 3. BOD 4.* 2016, AIHW: Canberra.
3. National Asthma Council Australia, *Australian Asthma Handbook*. 1.3 ed. 2017.
4. Levy, M. L., et al., *Wheeze detection: recordings vs. assessment of physician and parent*. J Asthma, 2004. 41(8): p. 845-53.
5. Elphick, H. E., et al., *Validity and reliability of acoustic analysis of respiratory sounds in infants*. Arch Dis Child, 2004. 89(11): p. 1059-63.
6. Dinakar, C., et al., *Clinical Tools to Assess Asthma Control in Children*. Pediatrics, 2017. 139(1).
7. Bekhof, J., R. Reimink, and P. L. Brand, *Systematic review: insufficient validation of clinical scores for the assessment of acute dyspnoea in wheezing children*. Paediatr Respir Rev, 2014. 15(1): p. 98-112.
8. Birken, C. S., P. C. Parkin, and C. Macarthur, *Asthma severity scores for preschoolers displayed weaknesses in reliability, validity, and responsiveness*. J Clin Epidemiol, 2004. 57(11): p. 1177-81.
9. Smith, S. R., J. D. Baty, and D. Hodge, 3rd, *Validation of the pulmonary score: an asthma severity score for children*. Acad Emerg Med, 2002. 9(2): p. 99-104.
10. Princess Margaret Hospital Emergency Department. *Asthma—Paediatric Acute Care Guidelines*. 2014; Available from: http://kidshealthwa.com/guidelines/asthma-2/.
11. Sharan, R. V., et al., *Predicting spirometry readings using cough sound features and regression*. Physiol Meas, 2018. 39(9): p. 095001.
12. Abeyratne, U. R., et al., *Cough sound analysis can rapidly diagnose childhood pneumonia*. Annals of Biomedical Engineering, 2013. 41(11): p. 2448-2462.
13. Kosasih, K., U. R. Abeyratne, and V. Swarnkar, *Wavelet augmented cough analysis for rapid childhood pneumonia diagnosis*. IEEE Trans on Biomed Eng., 2015. 62 (4): p. 1185-1194.
14. Sharan, R.V., et al., *Cough sound analysis for diagnosing croup in pediatric patients using biologically inspired features*. Conf Proc IEEE Eng Med Biol Soc, 2017. 2017: p. 4578-4581.
15. Sharan, R. V., et al., *Automatic Croup Diagnosis Using Cough Sound Recognition*. IEEE Trans Biomed Eng, 2018.
16. Uscher-Pines, L. and A. Mehrotra, *Analysis of Teladoc use seems to indicate expanded access to care for patients without prior connection to a provider*. Health Aff (Millwood), 2014. 33(2): p. 258-64.
17. World Health Organization, *Integrated Management of Childhood Illness: Chart Booklet*. 2014: Geneva, Switzerland.

LIST OF ABBREVIATIONS

PS Pulmonary Score
AM: Accessory Muscle
WA: Western Australia
LR: Logistic regression
CI: Confidence interval
SD: Standard deviation
BI: Breathing Index
RR: Respiratory rate
PEFR: Peak expiratory flow rate
FEV1: Forced expiratory volume in one second While the preferred set of features for testing and training are as set out in Table 2, the Inventors have found that a reduced feature set is also workable as follows:

TABLE 6

A reduced feature set

| Feature Number | Features | Cough Segments | P-value of features |
|---|---|---|---|
| 22 | KRT | Segment 1 | 0.0007 |
| 30 | Mfcc1 | Segment 3 | 0.0096 |
| 33 | Mfcc2 | Segment 3 | 0.0057 |
| 34 | Mfcc3 | Segment 1 | 0.0059 |
| 37 | mfcc4 | Segment 1 | 0.0024 |
| 44 | mfcc6 | Segment 2 | 0.0090 |
| 52 | mfcc9 | Segment 1 | 0.0008 |
| 63 | mfcc12 | Segment 3 | 0.0005 |
| 65 | WvL2 | | 0.0002 |
| 66 | WvL3 | | 0.0021 |
| 68 | WvL5 | | 0.0055 |
| 73 | WvL10 | | 0.0007 |

In table 6 KRT is short for "Kurtosis" and MFccn is short for "the nth MFCC" and WvL is short for Wavelet.

Terminology

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Furthermore, a processor may be a discrete integrated circuit that contains a plurality of processing cores and it may also be a number of discrete integrated circuits arranged to communicate with each other for cooperating to complete processing tasks.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Any modules described herein of certain embodiments may be implemented as software modules, hardware modules, or a combination thereof. In general, the word "module," as used herein, can refer to logic embodied in hardware or firmware or to a collection of software instructions executable on a processor. Additionally, the modules or components thereof may be implemented in analog circuitry in some embodiments.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

The invention claimed is:

1. A method of operating one or more processors to stratify the severity of asthma of a patient, the method comprising:
    receiving, by the one or more processors, acoustic data corresponding to sounds of the patient from an acoustic sensor;
    identifying, by the one or more processors, at least one cough sound in the acoustic data;
    determining, by the one or more processors, one or more overall cough sound feature values of the at least one cough sound for each of one or more characteristic features;
    determining a respiratory rate value, wherein the respiratory rate value is the respiratory rate of the patient or a value derived therefrom;
    applying, by the one or more processors, the overall cough sound feature values and the respiratory rate value to a pre-trained pattern classifier implemented by the one or more processors, wherein the pattern classifier is a logistic regression model, or a Bayesian decision machine, or a neural network, wherein said pattern classifier has been pre-trained with a training set of characteristic feature values from a population of asthmatic and non-asthmatic subjects;
    and monitoring an output from the pre-trained pattern classifier to deem the patient cough sound as indicating one of a number of degrees of severity of asthma, wherein the degrees of severity of asthma include "mild", "moderate", and "severe".

2. The method of claim 1, wherein the one or more overall cough sound feature values for the one or more characteristic features comprises values of wavelet features of the cough sound.

3. A method according to claim 1, wherein the respiratory rate value comprises a Breathing Index based on the respiratory rate taking into account age of the patient.

4. The method of claim 1, including segmenting, by the one or more processors, each at least one cough sound into a plurality of segments.

5. The method of claim 4, including determining, by the one or more processors, segment feature values for each of the plurality of segments in respect of each of a number of characteristic features.

6. The method of claim 5, wherein the plurality of segments comprises three segments.

7. The method of claim 6, wherein the determining, by the one or more processors, of feature values for each of a number of characteristic features comprises determining feature values as follows:

| Features | Cough Segment/ Overall Cough |
|---|---|
| KRT | Segment 1 |
| MFCC1 | Segment 3 |
| MFCC2 | Segment 3 |
| MFCC3 | Segment 1 |
| MFCC4 | Segment 1 |
| MFCC6 | Segment 2 |
| MFCC9 | Segment 1 |
| MFCC12 | Segment 3 |
| Wavelet (WvL)2 | Overall Cough |
| WvL3 | |
| WvL5 | |
| WvL10. | |

8. The method of claim 5, including applying, by the one or more processors, the segment feature values to the pre-trained pattern classifier in addition to the overall cough feature values and respiratory rate value.

9. The method of claim 5, wherein the determining, by the one or more processors, segment feature values for each of a number of characteristic features comprise determining values in respect of one or more of the segments for one or more of:

Mel-frequency cepstral co-efficient (MFCC)1, MFCC2, MFCC3, MFCC4, MFCC6, MFCC9 and MFCC12.

10. The method of claim 9, further comprising determining, by the one or more processors, Kurtosis values for a first segment.

11. The method of claim 5, wherein the determining, by the one or more processors, of segment feature values for each of a number of characteristic features comprise determining values in respect of each segment for one or more of:

Bispectrum Score (BGS);

Non-Gaussianity score (NGS);

first n formant frequencies (FF);

log energy (LogE);

zero crossing (ZCR);

kurtosis (Kurt);

first n Mel-frequency cepstral coefficients (MFCC).

12. The method of claim 5, wherein the determining, by the one or more processors, of segment feature values for each of a number of characteristic features comprises determining 21 feature values for each segment as follows:

| Feature | Number of Values |
|---|---|
| BGS | 1 |
| NGS | 1 |
| FF1, . . . , FF4 | 4 |
| LogE | 1 |
| ZCR | 1 |
| Kurt (KRT) | 1 |
| MFCC1-MFCC12 | 12 |
| Total: | 21. |

* * * * *